United States Patent [19]

Inoue

[11] Patent Number: 4,596,640
[45] Date of Patent: Jun. 24, 1986

[54] SHAPING METHOD AND APPARATUS USING AN AXIALLY MOVING CONTINUOUS ELONGATED TOOL

[75] Inventor: Kiyoshi Inoue, Tokyo, Japan

[73] Assignee: Inoue-Japax Research, Incorporated, Yokohama, Japan

[21] Appl. No.: 658,441

[22] Filed: Oct. 5, 1984

Related U.S. Application Data

[63] Continuation of Ser. No. 406,900, Aug. 10, 1982, abandoned, which is a continuation of Ser. No. 120,107, Feb. 8, 1980, Pat. No. 4,379,042, which is a continuation of Ser. No. 915,205, Jun. 13, 1978, abandoned.

[30] Foreign Application Priority Data

Jun. 14, 1977 [JP] Japan .................. 52-70248
Jul. 5, 1977 [JP] Japan .................. 52-80063
Aug. 16, 1977 [JP] Japan .................. 52-98440

[51] Int. Cl.⁴ .............. B23P 1/04; B23P 1/12; B28D 1/08
[52] U.S. Cl. .............. 204/129.46; 204/206; 204/224 M; 204/225; 51/62; 51/328; 125/16 R; 219/69 W
[58] Field of Search .............. 51/62, 135 R, 142, 328, 51/267; 125/12, 16 R, 21; 219/69 W; 204/129.46, 206, 209, 224 M, 129, 55, 225

[56] References Cited

U.S. PATENT DOCUMENTS

| | | | |
|---|---|---|---|
| 1,912,016 | 5/1933 | Sittner | 51/62 |
| 2,674,238 | 4/1954 | Dessureau et al. | 125/21 |
| 3,155,087 | 11/1964 | Dreyfus | 125/21 |
| 3,448,023 | 6/1969 | Bell | 51/267 X |
| 3,824,982 | 7/1974 | Bowman | 125/16 R |
| 3,831,576 | 8/1974 | Mech | 125/12 |
| 3,841,297 | 10/1974 | Mech | 125/12 |
| 3,849,624 | 11/1974 | Dulebohn | 219/69 W |
| 3,942,508 | 3/1976 | Shimizu | 125/16 R |
| 4,081,652 | 3/1978 | Janicke et al. | 219/69 W |
| 4,123,645 | 10/1978 | Shichida et al. | 219/69 W |
| 4,379,042 | 4/1983 | Inoue | 219/69 W X |

FOREIGN PATENT DOCUMENTS

| | | | |
|---|---|---|---|
| 1004747 | 2/1956 | Fed. Rep. of Germany. | |
| 2461466 | 3/1975 | Fed. Rep. of Germany. | |
| 717874 | 8/1954 | United Kingdom | 125/16 R |
| 771622 | 4/1957 | United Kingdom | 125/21 |

OTHER PUBLICATIONS

Drahterodieren—Jetzt Mit Numerischer Bahnsteuerung—by Werner Ullmann et al, pp. 32–36.
Crystal Cutting—Dec. 9, 1955—vol. 87—1351-1353.

Primary Examiner—Robert P. Olszewski
Attorney, Agent, or Firm—Karl F. Ross; Herbert Dubno

[57] ABSTRACT

A workpiece cutting method and apparatus in which an elongated wire or band tool spans a pair of guides and is continuously advanced relative to the workpiece by a first drive system but is reciprocated in the region of the workpiece by a second drive system at higher speed than the rate of continuous advance. This is permitted by storage devices between each guide and the first drive. The tool can carry out electrical machining and/or abrasive cutting using an abrasive bonded to the tool or in a machining fluid introduced into the cutting region.

10 Claims, 4 Drawing Figures

FIG. I

SHAPING METHOD AND APPARATUS USING AN AXIALLY MOVING CONTINUOUS ELONGATED TOOL

CROSS REFERENCE TO RELATED APPLICATIONS

This application is a continuation of application Ser. No. 406,900, filed 8/10/82 now abandoned which is a continuation of application Ser. No. 120,107 filed Feb. 8, 1980, now U.S. Pat. No. 4,379,042 granted Apr. 5, 1983, application Ser. No. 120,107 being a continuation of application Ser. No. 915,205 filed June 13, 1978 and now abandoned.

FIELD OF THE INVENTION

The field to which the present invention relates is the shaping of a workpiece with a continuous elongated tool which is moved axially in a direction from one end to the other through a machining region in which the workpiece is juxtaposed therewith in the presence of a machining fluid. The invention relates, more particularly, to an improved method of and apparatus for carrying out such shaping technique.

BACKGROUND OF THE INVENTION

In the shaping, cutting or machining techniques with which the invention is concerned, a wire-type or band-type elongated tool has been hitherto employed which is composed of a high-tensile-strength material which may have abrasive particles or grit pre-bonded thereon by electrodeposition or other bonding process so as to serve as cutting or grinding edges on the periphery of the carrier wire or band against a workpiece which is brought into contact with and urged against the axially moving wire or band tool. Alternatively, abrasive grits may be used in suspension with a machining fluid which is introduced into a machining region comprised of an axially moving wire or band tool and a workpiece urged thereagainst to undergo mechanical abrading actions by the suspended abrasive grit. It has also been proposed to use an electrically conductive wire or band as an axially travelling electrode in electrical-discharge or electrolytic machining processes with the machining fluid being constituted by a liquid dielectric or a liquid electrolyte. These latter processes may be carried out individually or in combination through the use of a suitable machining fluid and, also in combination with the use of abrasives prebonded to the electrode or in the form of a suspension as described. As the cutting proceeds, the workpiece is displaced relative to the moving wire or band tool along a prescribed path to impart to the workpiece a desired cut or shape.

SUMMARY OF THE INVENTION

In accordance with the present invention, there is provided an improved method of shaping a workpiece with an axially moving continuous elongated tool, comprising the steps of: (a) successively advancing the continuous elongated tool at a predetermined rate of axial movement from a supply reel to a take-up reel past a pair of guide members between which a cutting region is arranged while the elongated tool is kept taut therebetween; (b) storing under tension successive portions of the continuous elongated tool in a first zone between said supply reel and one of the guide members and in a second zone between the take-up reel and the other guide member; and (c) reciprocating the elongated tool between the guide members at a rate of movement which is higher than the first-mentioned rate of movement and with a stroke determined by the extent of storage of the tool in step (b).

The invention also provides an improved apparatus for shaping a workpiece with an axially moving continuous elongated tool, comprising a supply reel for feeding the continuous elongated tool at a predetermined rate; a take-up reel for winding up the continuous elongated tool under tension at a predetermined rate; a pair of guide members disposed across a cutting region between the supply and take-up reels in the path of the continuous moving elongated tool for guiding same; means for successively storing under tension the continuous elongated tool through a first zone between the supply reel and one of said guide members and a second zone between said take-up reel and the other guide member; and means for reciprocating said continuous elongated tool between the guide members at a rate of movement which is higher than the take-up movement of the elongated tool and with a stroke determined by the extent of storage of the tool by the storing means.

BRIEF DESCRIPTION OF THE DRAWING

These and other features of the invention, as well as advantages thereof, will become more readily apparent from the following description made with reference to the accompanying drawing in which.

SPECIFIC DESCRIPTION

Figure 1:
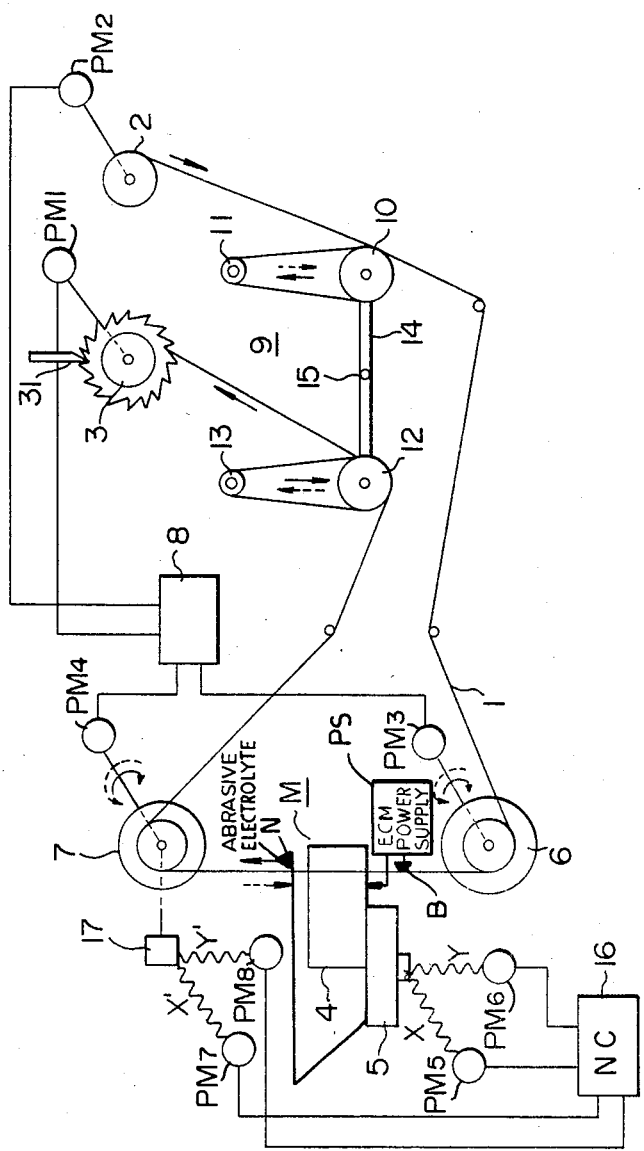
FIG. 1 is a schematic view diagrammatically illustrating an embodiment of the invention.

In FIG. 1 a continuous elongated tool 1 is shown to be fed from a supply reel 2 and wound up on a take-up reel 3 after traversing a cutting region M in which a workpiece 4 is disposed mounted upon a work table 5. The tool 1 which may be in the form of a wire or band is typically composed of piano wire, tungsten, copper, brass copper-zinc-tin alloy or the like thermally and electrically conductive material and has a diameter of 0.1 to 1 mm. Where the workpiece 4 is to be machined at least in part by mechanical abrading actions, the tool 1 makes use of abrasive particles prebonded on the periphery thereof or, alternatively, of abrasive particles suspended in a machining fluid to be carried into the machining region M. Such abrasive particles are typically composed of diamond, WC, $B_4C$, BN, SiC, $ZrO_2$, $Al_2O_3$ or the like abrasive material which may be attached on the tool 1 by electrodeposition with Ni, Cu or the like electrically conductive substance or by any other bonding technique, or alternatively may directly be used in suspension in the machining fluid.

Figure 2:
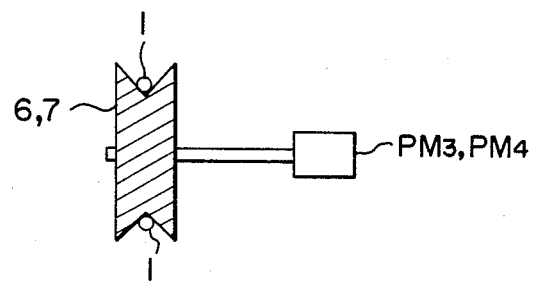
FIG. 2 is a schematic view partly in section diagrammatically illustrating portions of the embodiment of FIG. 1.

In the path of the continuous elongated tool 1, which will hereinafter be sometimes referred to as a "wire", "wire tool" or "wire electrode" the meaning of which also encompasses a band or the other elongated body, there are provided guide members 6 and 7 across the machining region M for guiding and supporting the tool 1 under tension therebetween and are shown each in the form of a roller with a V-groove having a tool-contacting surface composed of a hard rubber, polyurethane, fluoride resin or the like hard frictional material for frictionally guiding the tool (FIG. 2).

In order to continuously feed the tool 1 from the supply reel 2 to the take-up reel 3 at a relatively low velocity, say, of 0.1 to 5 meters/minute, there are provided motors, preferably pulse motors, PM1 and PM2, for driving the take-up reel 3 and the supply reel 2, respectively, with the motors PM1 and PM2 being controlledly energized by a control unit 8 so as to cause the continuous elongated tool 1 to travel while being taut under a suitable tension from the supply reel 2 to the take-up reel 3.

Shown at 31 is a rotation-reversal arrester clutch. Where the tool 1 is moved in the opposite direction, the reels 2 and 3 serve, of course, as take-up and supply reels, respectively.

In the transport path of the continuous elongated tool 1, there is also provided a successive tool storage unit 9 comprising a movable roller 10 and a fixed roller 11 associated therewith, and a second movable roller 12 and a second fixed roller 13 associated therewith. Thus, the tool 1 supplied from the reel 2 first runs on the pair of rollers 10 and 11 and, past the machining region M between the guide members 6 and 7, is fed to run on the second pair of rollers 12 and 13 and finally wound up on the reel 3.

The movable rollers 10 and 12 coupled together by a rotary arm 14 and disposed at its opposite ends. The arm 14 has a pivot 15 at its center on which it is swingable so as to counter-balance tensions upon the moving wire 1 at its both sides.

The guide rollers 6 and 7 are adapted to be rotated by motors, preferably pulse motors PM3 and PM4 to axially reciprocate the wire tool 1 stretched therebetween. The rotation of the motors PM3 and PM4 is controlled by the control unit 8 to produce the axial reciprocation of the wire tool 1 at a relatively high velocity, say, of 5 to 30 meters/second.

The work table 5 carrying the workpiece 4 is displaced in an X-Y plane of an X-axis motor, preferably pulse motor, PM5 and a Y-axis motor, preferably pulse motor, PM6 under the command of a numerical-control unit 16 so that the cutting of the workpiece 4 by the tool 1 is effected in a predetermined pattern preprogrammed therein. With motors PM5 and PM6 constituted each by a pulse or stepping motor, it is advantageous to incrementally drive or displace the workpiece 4 relative to the wire tool 1 with an increment of displacement, say, of 1 to 5 microns or less per drive signal pulse applied to each motor.

One of guide members 7 is shown associated with a subsidiary table 17 which displaces it in an X'-Y' plane to give the moving wire 1 between the guide members 6 and 7 a predetermined inclination so that a taper cutting of the workpiece 4 can be performed. This displacement of the displaceable guide member 6 or 7 is effected by an X'-axis motor, preferably pulse motor PM7 and a Y'-axis motor, preferably pulse motor, PM8, both controlled by command signals from the numerical controller 16.

Cutting of the workpiece 4 with the moving continuous elongated tool 1 is effected by individual or combined mechanical abrading, electrolytic (or electrochemical) and electrical-discharge machining actions. When electrolytic machining is involved, a liquid electrolyte is supplied to the cutting region M from a fluid-supply unit or nozzle N while an ECM power supply PS of the type well known in the art is provided with its one terminal electrically connected to the workpiece 4 and other terminal to the moving elongated tool 1 through a brush arrangement B well known in the art. When electrical-discharge machining is involved, the machining fluid is replaced by a dielectric liquid such as a distilled water and the power supply is a suitable EDM power source for producing a succession of electrical discharges between the workpiece 4 and the moving wire tool 1.

In operation, the wire tool 1 is fed from the supply reel 2 and, under a suitable tension, is advanced between the guide members 6 and 7 to act to cut the workpiece 4 and is eventually wound on the take-up reel 6 of a relatively low rate of movement in the order already mentioned. On the way from the supply reel 2 to the guide member 6, the wire tool 1 is wound on rollers 10 and 11 in one or more turns where it is permitted to be stored over a predetermined length. Likewise, on the way from the guide member 7 to the take-up reel 3, the wire tool 1 is wound on rollers 12 and 13 in one or more turns where it is stored.

While the wire tool 1 is being advanced from the supply reel 2 to the take-up reel 3 at a low velocity by the operation of the motors PM1 and PM2 under command of the control unit 8, the latter also operates the pulse motors PM3 and PM4 so that the guide members 6 and 7 driven thereby synchronously rotate in one and the other directions alternatively to reciprocate the wire tool 1 carried to the region thereof at a high velocity of 5 to 30 meters/second which is sufficiently higher than the continuous wire supply or take-up velocity of 0.1 to 5 meters/minute. Thus, when the wire 1 is rapidly moved in each such reciprocation cycle in the direction indicated by the solid arrow by the positive rotation of the motors PM3 and PM4, this rapid movement causes the movable roller 10 in the wire storage unit 9 to approach the fixed roller 11 to reduce their spacing while allowing the second movable roller 12 to move away from the second fixed roller 13 to increase their spacing when the rotary arm 14 is caused to rotate counter-clockwise until the positive rotation of the motors PM3 and PM4 is terminated by the control unit 8. In the second half (negative) cycle of each reciprocation, the motors PM3 and PM4 cause the wire 1 to rapidly move in the direction indicated by the broken arrow. This brings about a clockwise rotation of the arm 14 by causing the roller 12 to approach the roller 13 thus to release the portion of the wire 1 previously stored in these two rollers while permitting the roller 10 to move away from the roller 11 thus to cause a portion of the wire 1 from the supply reel 2 to be temporarily stored in the latter roller pair. Such cyclic operation of motors PM3 and PM4 allows a smooth axial reciprocation of the wire tool 1 in the machining region M at a sufficient speed without producing sagging in the tool transport path.

The improvement according to the invention thus provides a highly efficient use of an elongated tool and machining operations at a markedly enhanced efficiency, accuracy and cutting stability. Since the tool 1 is continuously renewed for consecutive machining by supply and take-up reels 2 and 3 to compensate for tool wear, variation of the cutting width corresponding to the width of the cutting edge which would otherwise occur is advantageously eliminated to yield highly accurate machining results and a possible breakage of the tool due to wear of the cutting edge is avoided so that an extremely stable and efficient machining operation is assured.

Figure 3:
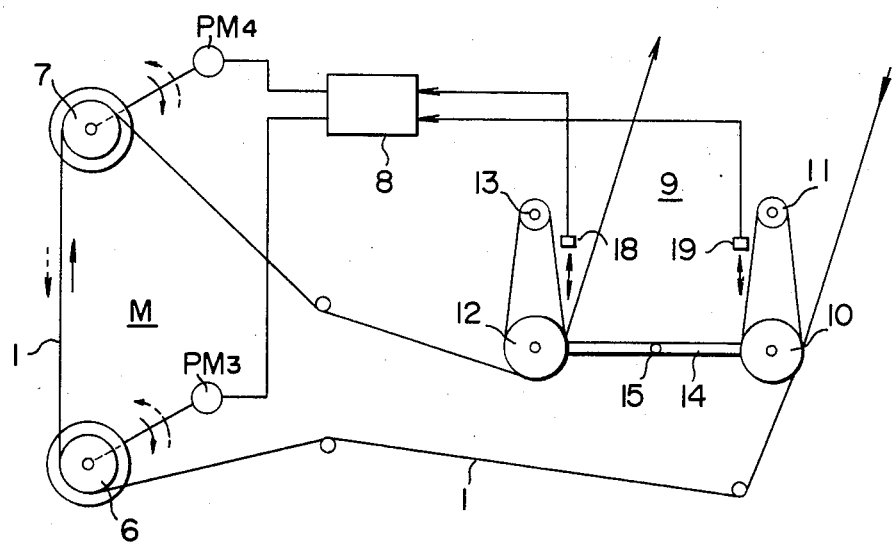
FIG. 3 is a schematic view diagrammatically illustrating a further embodiment of the invention.

In the arrangement of FIG. 3, the wire storage unit 9 is provided with switches 18 and 19 are electrically, electromagnetically or optically responsive to the approaching displacement of movable rollers 12 and 10, respectively, each for providing a corresponding signal to the control unit 8 to switch over the rotary direction of the motors PM3 and PM4 for a cyclic operation of the tool axial reciprocation according to the invention.

Figure 4:
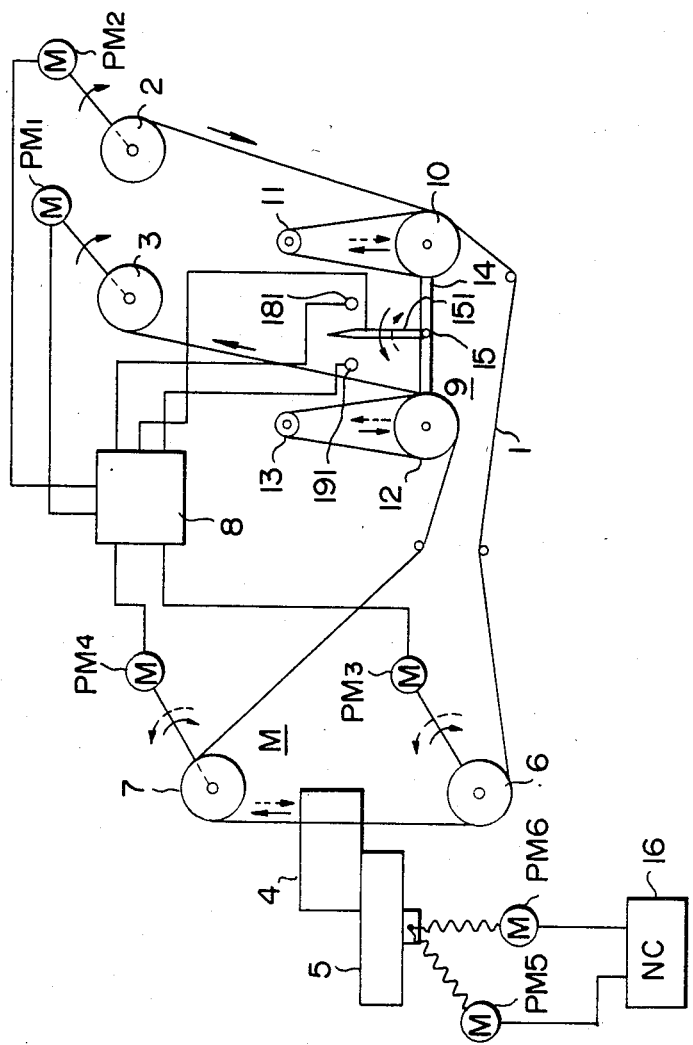
FIG. 4 is a diagrammatic illustration of a modification of the embodiment of FIG. 3.

In a modification of FIG. 4, a detector unit of the function provided in the embodiment of FIG. 3 is constituted by an electrically conductive kneedle 151 securely attached to the hinge 15 for swinging with the rotary motion of the arm 14 for contact with switch elements 181 and 191 to provide the control unit 8 with cyclic signals for the rapid axial reciprocation of the slowly unidirectionally moving continuous wire tool 1.

EXAMPLE

Various materials are machined with an arrangement which has been described and illustrated using a continuous piano wire of 0.2 mm diameter by (a) mechanical abrading with SiC abrasive grits pre-bonded by electrodisposition with copper to the wire tool; (b) mechanical abrading with the abrasive wire tool of (a) and further $Al_2O_3$ abrasive grits supplied in suspension with the machining fluid; (c) combined electrolytic and abrasive machining with the wire tool of (a) and by supply with a series of electric pulses of a pulse duration of 10 microseconds, a pulse interval of 20 microseconds and a peak current of 1.5 ampere and using a liquid electrolyte as machining fluid; and (d) combined electrolytic and abrasive machining similar to (c) with the exception of an additional use of $Al_2O_3$ abrasive grits supplied in suspension with the electrolyte. In each case, the wire tool is reciprocated at a velocity of 13 meters/second and is urged relatively against the workpiece at a force of 250 grams. Results are summarized in the table below.

| Workpiece Material | Removal Rate | | | |
|---|---|---|---|---|
| | (a) mm/min | (b) mm/min | (c) mm/min | (d) mm/min |
| Cu | 0.08 | 0.09 | 0.55 | 0.6 |
| Fe (hardened) | 0.07 | 0.1 | 0.42 | 0.58 |
| WC | 0.09 | 0.09 | 0.5 | 0.6 |
| SKD | 0.08 | 0.1 | 0.4 | 0.63 |
| 18-8 stainless steel | 0.075 | 0.09 | 0.45 | 0.62 |

There is thus provided an improved shaping method and apparatus with an axially moving continuous elongated tool which carries out a cutting operation with an increased efficiency, stability and precision.

I claim:

1. An apparatus for shaping a workpiece at least partially abrasively with an axially moving continuous elongate tool in the presence of an abrasive medium, the apparatus comprising:

supply means for said continuous elongate tool;

means for continuously advancing said continuous elongate tool at a predetermined rate of axial advancement in the range between 0.1 and 5 meters/minute;

take-up means for receiving said continuous elongate tool under tension;

a pair of guide members disposed across a cutting region between said supply and take-up means in the path of said continuous elongate tool for guiding the same;

means for successively storing under tension said continuous elongate tool through a first zone between said supply means and one of said guide members and through a second zone between the other guide member and said take-up means;

means for reciprocating said continuous elongated tool between said guide members at a predetermined rate of axial movement in the range between 5 and 30 meters/second and with a stroke determined by the storage of said tool stored by said storing means;

drive means including a pair of pulse motors controlled by a numerical controller for displacing said workpiece in an X-Y plane relative to said continuous elongate tool reciprocatingly advancing in abrasive contact therewith, incrementally with an increment of displacement of 1 to 5 microns and along a predetermined contouring path in said plane to machine a correspondingly shaped contour in the workpiece;

means for supplying a liquid electrolyte between said reciprocating advancing elongate tool and said workpiece; and means for passing an electric current between said reciprocatingly advancing elongate tool and said workpiece through said liquid electrolyte so as to effect an additional stock removal by an electrochemical action.

2. The apparatus as defined in claim 1, further comprising subsidiary drive means associated with one of said guide members and constituted by a pair of pulse motors controlled by said numerical controller for effecting displacement of said one guide member in an X'-Y' plane transverse to the axial direction of said elongate tool reciprocating advancing and substantially in parallel with said X-Y plane to permit a tape cutting of the workpiece.

3. The apparatus defined in claim 1 wherein said abrasive medium is a part of said elongate tool.

4. The apparatus defined in claim 1, further comprising means for introducing said abrasive medium in the form of abrasive particles suspended in a fluid between said reciprocatingly advancing elongate tool and said workpiece.

5. In a method of shaping a conductive workpiece at least partially abrasively with an axially moving continuous elongate electrode tool in the presence of an abrasive medium wherein:

said continuous elongate tool is successively advanced at a predetermined rate of axial advancement from a supply means to a take-up means past a pair of guide members between which a cutting region is arranged while said elongate tool is kept taut therebetween;

successive portions of said continuous elongate tool are stored under tension in a first zone between said supply means and one of said guide members and in a second zone between the other guide member and said take-up means;

said elongate tool is reciprocated between said guide members at a predetermined rate of axial reciprocating movement and with a stroke determined by the amount of said storage of the tool;

said workpiece is displaced transversely relative to said continuous elongate tool reciprocatingly advancing in abrasive contact therewith to abrasively remove stock from the workpiece, the improvement which comprises the steps of:

(a) setting said rate of axial advancement in the range between 0.1 and 5 meters/minute;

(b) in conjunction with step (a), setting said rate of axial reciprocating movement in the range of 5 to 30 meters/second; and (c) effecting said relative transverse displacement between the workpiece and the elongate tool incrementally with an increment of displacement between 1 and 5 microns set in conjunction with steps (a) and (b) and along a predetermined contouring two-dimensional path to machine a correspondingly shaped contour in the workpiece while (d) supplying a liquid electrolyte between said reciprocatingly advancing elongate tool and said workpiece and (e) passing an electric current between said reciprocating advancing elongate tool and said workpiece through said electrolyte so as to effect an additional stock removal by an electrochemical action.

6. The method defined in claim 5 wherein said abrasive medium is a part of said elongate tool.

7. The method defined in claim 5 wherein said abrasive medium is in the form of abrasive particles introduced in suspension with a fluid between said reciprocatingly advancing tool and said workpiece.

8. A conductive method of shaping a workpiece at least partially abrasively with an axially moving continuous elongate electrode tool in the presence of an abrasive medium, comprising the steps of:

(a) successively advancing said continuous elongate tool at a predetermined rate of axial movement from a supply means including a supply reel to a take-up means past a pair of guide members between which a cutting region is arranged while said elongate tool is kept taut therebetween, by pulsively driving said supply reel and said take-up means with a pair of first pulse motors;

(b) storing under tension successive portions of said continuous elongate tool through a first zone between said supply reel and one of said guide members and through a second zone between the other guide member and said take-up means;

(c) reciprocating said elongate tool between said guide members at a rate of axial movement which is higher than the first-mentioned rate of axial movement and with a stroke determined within the storage of said tool stored in step (b), by pulsively driving said guide members with a pair of second pulse motors; and (d) displacing with a pair of third pulse motors said workpiece relative to said continuous elongate tool reciprocatingly advancing in abrasive contact therewith, incrementally under numerical control at an increment of displacement in the range between 1 and 5 microns, said first-mentioned rate of axial movement being in the range of 0.1 and 5 meters/minute and the second-mentioned rate of axial movement being in the range between 5 and 20 meters/second while and (e) supplying a liquid electrolyte to said cutting region and passing electric current between said tool and said workpiece through said electrolyte so as to effect an additional stock removal by an electrochemical action.

9. The method defined in claim 8 wherein said abrasive medium is a part of said elongate tool.

10. The method defined in claim 8 wherein said abrasive medium is in the form of abrasive particles introduced in suspension with said liquid electrolyte between said reciprocatingly advancing tool and said workpiece.

* * * * *